P. H. THOMAS.
METHOD OF OPERATING VAPOR ELECTRIC DEVICES.
APPLICATION FILED APR. 12, 1905.
973,997.
Patented Oct. 25, 1910.
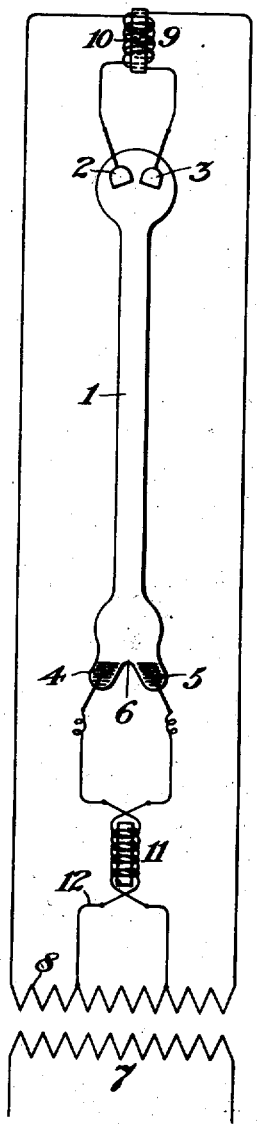

UNITED STATES PATENT OFFICE.

PERCY H. THOMAS, OF MONTCLAIR, NEW JERSEY, ASSIGNOR TO COOPER HEWITT ELECTRIC COMPANY, OF NEW YORK, N. Y., A CORPORATION OF NEW YORK.

METHOD OF OPERATING VAPOR ELECTRIC DEVICES.

973,997. Specification of Letters Patent. Patented Oct. 25, 1910.

Original application filed January 27, 1905, Serial No. 242,862. Divided and this application filed April 12, 1905. Serial No. 255,082.

*To all whom it may concern:*

Be it known that I, PERCY H. THOMAS, a citizen of the United States, and resident of Montclair, county of Essex, State of New Jersey, have invented certain new and useful Improvements in Methods of Operating Vapor Electric Devices, of which the following is a specification.

When single-phase alternating current vapor lamps provided with a single negative electrode are started into operation by rupturing an internal circuit, it sometimes happens that the break in the circuit does not occur at the right phase for constituting the electrode which is intended for the negative electrode of the apparatus a true negative electrode. Consequently, the rupturing of the internal circuit has to take place a number of times before the right moment of rupture is hit upon. It is obviously of advantage at times to provide apparatus which will start at every attempt. To accomplish this purpose I provide two negative electrodes within the container of the apparatus, the same being connected to points in the supply circuit approximating the neutral point but separated by a sufficient potential to cause some flow of current if the two negative electrodes should accidentally become connected. In other respects the circuits are as usual.

To start the apparatus, the lamp or other vapor device is shaken or tilted so as to bring the two negative electrodes into contact and separate them. The negative electrode resistance is thus broken down and the lamp or other device will start into operation through one of the positive electrodes and through the negative electrode which happens to be a true negative electrode at the moment of rupture. The device continues in operation upon the negative electrode at which the operation starts, or it may be so arranged as to work through both of the negative electrodes which may then be connected, or in case of an accidental reestablishment of contact between the negative electrodes the current may be transferred to the other negative electrode instead of remaining at the one through which it starts.

For the purpose of regulating the short circuit current and maintaining proper operation of the apparatus, I may provide an inductance in the connection between either of the negative electrodes and the source or an inductance common to both circuits.

The invention will be understood by reference to the accompanying drawing which is a diagram of an apparatus well adapted to the carrying out of my invention.

In the drawing, 1 is the container of a vapor lamp having two positive electrodes, 2 and 3, and two negative electrodes, 4 and 5, the latter electrodes are in this instance represented as of mercury and are separated by a ridge, 6, the electrodes themselves being contained in pockets formed on opposite sides of this ridge. The negative electrodes are joined externally to a source of alternating current which in this instance is represented as a transformer having a primary, 7, and a secondary, 8, the secondary terminals being joined to the positive electrodes 2 and 3 through an inductance, 9, having a core, 10. The core 10 is represented as being surrounded by two windings, one of which is contained in the circuit leading from one terminal of the secondary to the positive electrode 2 and the other of which is shown as being included in the circuit leading from the other terminal of the secondary to the positive electrode 3. Current flowing through one winding of the inductance 9 to the electrode 2 and the negative electrode of the apparatus stores energy in the core 10, which energy may be delivered to the apparatus either in the winding of the device 9 connected to the positive electrode 2 or in any other winding upon the same core as, for example, the winding connected in series with the positive electrode 3. Similarly energy stored by current through the winding of the inductance 9 connected with the positive electrode 3 may be delivered in any of the windings upon the core 10. Thus, at any time energy may be delivered from the core 10 to the apparatus as, for example, at the zero point of the alternating current wave or at the time of any momentary tendency for the establishment of the negative electrode resistance.

The connections from the negative electrodes 4 and 5 to the secondary 8 are made at points on opposite sides of the neutral point of the said secondary so that there is a difference of potential between the two electrodes sufficient to cause the flow of a small current when the electrodes are in contact with each other, either at the moment of starting or through accidental causes after the operation has begun. The leads from the negative electrodes are wound upon the common core 11 before being joined to a loop 12, which leads to the points in the secondary on opposite sides of the neutral point. There is thus constituted between the negative electrodes and the source of alternating current an inductance which assists in steadying the operation of the device.

The functions of the resistance 11 will be fully understood from the following explanation of the starting and operation. When current is impressed upon the source 7 and connection exists between the electrodes 4 and 5 within the container, current will pass from the limited portion of the winding 8 which is included between the connections leading to the electrodes 4 and 5 through the two windings of the inductance 11 and the electrodes 4 and 5 and the connections between them. Since these connections are of comparatively low resistance, as is the mercury of the electrodes 4 and 5, a considerable current would tend to flow if the inductance 11 were not present. Since, however, the windings are so directed with respect to the core that current flowing to the electrode in one winding and from the electrode in the other winding tend to magnetize in the same direction, a considerable inductance is introduced which serves to control the initial current. Since this current is alternating, current will sometimes be passing into one electrode and sometimes out of this electrode, but since the arrangement is symmetrical either of the electrodes is equally capable of acting as a normal negative, so that when the break occurs within the vacuum between the electrodes 4 and 5 after the establishment of the initial alternating current from the winding 8, whichever electrode happens at that instant to be acting as the negative, will receive current from the positive in the normal way and act as the normal negative. In case, however, the electrodes 4 and 5 become connected within the chamber, current will evidently flow through both windings of the inductance 11, since in this way the total inductance will be least in view of the fact that currents passing to two electrodes tend to magnetize the core in opposite directions.

To start the lamp, the container is shaken so as to bring the materials constituting the electrodes 4 and 5 into contact over the ridge 6, after which the separation takes place and the current which, during the period of contact, has been caused to flow across the negative electrodes, is interrupted, and a flow takes place between the electrodes after separation. This causes a local breaking down of the negative electrode resistance, after which the current applied through the positive electrodes 2 and 3 is able to traverse the vapor in the apparatus and set the lamp or other device into operation. It is clear that the flow will take place from one or the other of the positive electrodes to that one of the negative electrodes which happens to be in proper relation to the coöperating positive electrode for being made active as the negative electrode of the apparatus. Thus no second shaking or tilting of the container will be necessary in order to insure the starting of the apparatus. Should the electrodes 4 and 5 be accidentally brought into contact while the apparatus is operating, there will be no interruption of the operation, inasmuch as the main current will find a relatively easy path through the apparatus at all times after the initial breaking down of the negative electrode reluctance. It may, however, happen that the current will be transferred from the original negative starting electrode to the other electrode, or if the apparatus should become clogged, so as to maintain the negative electrode in contact, both electrodes may serve as negative electrodes.

This application is a division of my application Serial Number 242,862, filed January 27, 1905.

I claim as my invention:—

1. The method of insuring the starting of a vapor electric apparatus having a plurality of positive electrodes and two negative electrodes, which consists in applying to the positive electrodes an alternating electro-motive-force capable of traversing the apparatus under normal conditions of operation through either negative electrode, affecting the negative electrodes by an inferior alternating electro-motive-force sufficient to locally break down the negative electrode reluctance on each separation of the negative electrodes and causing such separation.

2. The method of keeping alive a vapor electric device requiring the storing and periodic delivery of energy to the device, and in which a plurality of leads connect different points of a source of electrical energy to a plurality of positive electrodes, which consists in passing energy from the source to the device through the several leads, storing energy at a common point by the passage of current in any anode lead and discharging said energy in the same direction through any anode lead.

3. The method of keeping alive a vapor electric device requiring the storing and periodic delivery of energy to the device, and in which a plurality of leads connect the different points of a source of electrical energy to a plurality of positive electrodes, which consists in storing energy at a common point on the flow of current from the source in each anode lead and discharging said energy in the same direction through any anode lead.

4. In a vacuum vapor electric apparatus subject to periodic and momentary instants of deficiency in electrical supply and adapted to operate through a plurality of positive electrodes connected to different points in the supply and having suitable connections for completing the circuits of the positive electrodes, the method of operation which consists in initially storing energy at a common point from each of the supply impulses passing through the apparatus, discharging this energy from storage to any of said electrodes as conditions may require and renewing the energy at the common storage point after each discharge.

5. In a system of electrical distribution in which is inserted a vacuum vapor electric apparatus including an exhausted container and suitable positive and negative electrodes therein and adapted to be started during any alternation, said apparatus being supplied from an alternating current source and its negative electrode starting reluctance being overcome by the breaking of a current carrying contact within the vacuum, the method of operation which consists in providing alternative normal operating paths for rectified current, utilizing said paths coöperatively, together with alternating current from the source, for overcoming the negative electrode reluctance and simultaneously impressing the normal operating electromotive force upon the system.

6. In a system of electrical distribution in which is inserted a vacuum vapor electric device, including an exhausted container and positive and negative electrodes therein, said device being adapted to be started during any alternation, and a suitable alternating current source, the method of starting which consists in passing alternating current through a plurality of alternative normal operating paths through the container, anterior to the initiation of normal current flow through said container, for the purpose of starting said normal current flow, limiting said alternating current externally to said container and passing normally rectified currents freely through the path of the starting alternating current after the initiations of normal current flow.

7. In a vacuum vapor electric apparatus, the method of transferring from one negative electrode to another, current naturally tending to run upon the latter but momentarily operating from the former, which consists in passing normal current to one negative electrode through the container, connecting conductively this negative electrode with a second coöperating negative electrode while the normal current is still flowing, passing current from the first named electrode through the second named electrode and subsequently separating the electrodes.

Signed at New York, in the county of New York, and State of New York, this seventh day of April, A. D. 1905.

PERCY H. THOMAS.

Witnesses:
 WM. H. CAPEL,
 THOS. H. BROWN.